United States Patent
Samuthira Pandian et al.

(10) Patent No.: US 11,830,977 B2
(45) Date of Patent: Nov. 28, 2023

(54) METHOD TO REDUCE INTERFACIAL RESISTANCE OF HYBRID SOLID-STATE ELECTROLYTES FOR SECONDARY ENERGY STORAGE DEVICES

(71) Applicant: International Business Machines Corporation, Armonk, NY (US)

(72) Inventors: Amaresh Samuthira Pandian, San Jose, CA (US); Phillip Medina, San Jose, CA (US); Young-Hye Na, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 17/184,654

(22) Filed: Feb. 25, 2021

(65) Prior Publication Data
US 2022/0271336 A1 Aug. 25, 2022

(51) Int. Cl.
*H01M 10/0565* (2010.01)
*H01M 10/058* (2010.01)
*H01M 10/0567* (2010.01)
*H01M 10/0568* (2010.01)

(52) U.S. Cl.
CPC ..... *H01M 10/0565* (2013.01); *H01M 10/058* (2013.01); *H01M 10/0567* (2013.01); *H01M 10/0568* (2013.01); *H01M 2300/0051* (2013.01); *H01M 2300/0062* (2013.01); *H01M 2300/0082* (2013.01)

(58) Field of Classification Search
CPC ........... H01M 10/056; H01M 10/0565; H01M 10/0567; H01M 10/0568; H01M 2300/0051; H01M 2300/0062; H01M 2300/0068; H01M 2300/0082
See application file for complete search history.

(56) References Cited

U.S. PATENT DOCUMENTS

| | | | |
|---|---|---|---|
| 7,070,632 B1 * | 7/2006 | Visco | H01M 4/5815 429/231.95 |
| 7,358,288 B2 | 4/2008 | Kerres | |
| 7,811,694 B2 | 10/2010 | Song | |
| 8,304,134 B2 | 11/2012 | Miyake | |
| 9,520,627 B2 | 12/2016 | Aetukuri | |
| 10,096,839 B2 | 10/2018 | Dekel | |
| 10,199,691 B2 | 2/2019 | Kim | |
| 10,320,029 B2 | 6/2019 | Zaghib | |
| 10,418,607 B2 | 9/2019 | Matsumura | |
| 10,559,398 B2 | 2/2020 | Aetukuri | |
| 10,680,278 B2 | 6/2020 | Woehrle | |

(Continued)

FOREIGN PATENT DOCUMENTS

| | | |
|---|---|---|
| CN | 103647107 B | 2/2016 |
| CN | 208102337 U | 11/2018 |

(Continued)

*Primary Examiner* — Scott J. Chmielecki
(74) *Attorney, Agent, or Firm* — Aaron Pontikos (57) ABSTRACT

A hybrid solid-state electrolyte is disclosed. The hybrid solid-state electrolyte includes an inorganic ion-conducting membrane. The hybrid solid-state electrolyte further includes a first layer of an organic liquid solution surrounding a surface of the inorganic ion-conducting membrane. The hybrid solid-state electrolyte further includes a second layer of an ion-conducting polymer surrounding the first layer of the organic liquid solution.

20 Claims, 7 Drawing Sheets

(56) References Cited

U.S. PATENT DOCUMENTS

| | | | |
|---|---|---|---|
| 2004/0101760 A1 | 5/2004 | Kerres | |
| 2009/0005824 A1* | 1/2009 | Visco | A61N 1/0448 607/3 |
| 2015/0255767 A1 | 9/2015 | Aetukuri | |
| 2018/0040904 A1* | 2/2018 | Choi | H01M 10/0525 |
| 2018/0330844 A1* | 11/2018 | Aetukuri | H01M 10/058 |
| 2018/0375148 A1* | 12/2018 | Yersak | C03C 3/32 |
| 2019/0013516 A1* | 1/2019 | Herle | B32B 27/36 |
| 2019/0088987 A1* | 3/2019 | Herle | H01M 10/0562 |
| 2019/0190000 A1* | 6/2019 | Herle | B33Y 40/00 |
| 2019/0372149 A1 | 12/2019 | Cho | |
| 2020/0014063 A1* | 1/2020 | Visco | H01M 50/406 |
| 2020/0259212 A1* | 8/2020 | Visco | H01M 50/497 |
| 2021/0344038 A1* | 11/2021 | He | H01M 10/0525 |

FOREIGN PATENT DOCUMENTS

| | | |
|---|---|---|
| CN | 110010964 A | 7/2019 |
| CN | 110265711 A | 9/2019 |
| CN | 111435758 A | 7/2020 |

* cited by examiner

METHOD TO REDUCE INTERFACIAL RESISTANCE OF HYBRID SOLID-STATE ELECTROLYTES FOR SECONDARY ENERGY STORAGE DEVICES

BACKGROUND OF THE INVENTION

The present invention relates generally to the field of secondary energy storage devices, and more particularly to reducing interfacial resistance of hybrid-solid state electrolytes for secondary energy storage devices.

Energy storage devices such as lithium ion batteries have high energy density, and provide a compact, rechargeable energy source suitable for use in portable electronics, electric transportation, and renewable energy storage. Solid-state batteries that have metallic lithium as an anode allow for higher energy density than the current state of the art lithium-ion batteries.

SUMMARY

In one embodiment of the present invention, a hybrid solid-state electrolyte is disclosed. The hybrid solid-state electrolyte includes an inorganic ion-conducting membrane. The hybrid solid-state electrolyte further includes a first layer of an organic liquid solution surrounding a surface of the inorganic ion-conducting membrane. The hybrid solid-state electrolyte further includes a second layer of an ion-conducting polymer surrounding the first layer of the organic liquid solution.

In another embodiment of the present invention, an energy storage device is disclosed. The energy storage device includes an inorganic ion-conducting membrane. The energy storage device further includes a first layer of an organic liquid solution surrounding a surface of the inorganic ion-conducting membrane. The energy storage device further includes a second layer of an ion-conducting polymer surrounding the first layer of the organic liquid solution. The energy storage device further includes a plurality of electrodes.

In another embodiment of the present invention, a method for making an energy storage device is disclosed. The method includes applying a first layer of an organic liquid solution to an inorganic ion-conducting membrane. The method further includes applying a second layer of an ion-conducting polymer or a precursor of the ion-conducting polymer over the organic liquid solution. The method further includes assembling the ion-conducting membrane including the first layer of the organic liquid solution and the second layer of the ion-conducting polymer or the precursor and a plurality of electrodes to form the energy storage device.

DETAILED DESCRIPTION

Solid electrolytes play a major role in the operation of an all-solid state battery. An example of a solid electrolyte configuration can be found in U.S. Pat. No. 9,520,627B2, which is incorporated herein by reference in its entirety. In U.S. Pat. No. 9,520,627B2, a thin and flexible ion-conducting membrane having a solid electrolyte ceramic particle inter-connected through a non-ion-conducting (insulating) polymer binder can be seen. The membrane is single-particle thick and can be tuned for various sized ceramic particles. The particles are connected circumferentially with the insulating polymer such that the top and bottom surface of the particle remains open for ion conduction. The membrane possesses high ionic conductance and effectively suppresses dendrite growth on the surface of a metallic electrode since the ceramic particles have a higher modulus than alkaline metals such as lithium and sodium. Even though the polymer matrix has a lower shear modulus than lithium, the insulating nature of the polymer prevents dendrite growth towards the polymer matrix. Although this membrane has demonstrated a strong potential for realizing high energy density lithium-metal batteries using liquid electrolytes, its practical implementation may be less suited in an all-solid-state battery due to the physical and chemical nature of the membrane. This stems from the fact that when the membrane as taught by U.S. Pat. No. 9,520,627B2 is within a solid-state electrolyte, the rough surface caused by the irregular shape and size of the ceramic particles introduces contact points with the electrodes. This in turn can increase the possibility of failure due to structural deformation at the electrodes. In some instances, the ceramic particles can also react with the metallic anode material. Accordingly, the membrane must be tuned in order to obtain a smooth and more appropriate surface to enable usage in a solid-state battery configuration.

One possible solution to the aforementioned deficiencies is through the creation of a hybrid-solid state electrolyte, in which a polymer electrolyte with appropriate ionic conductivity is introduced above and below the membrane. The net effect of introducing a polymer electrolyte above and below the membrane is the formation of a smooth surface, which ultimately improves interfacial contact with electrodes.

However, embodiments of the present invention recognize that the use of a polymer electrolyte layer can act as a protecting layer, where the ceramic particles in the membrane become reactive to the metallic lithium electrode. Consequently, when the ceramic composite membrane is integrated with the ion-conducting polymer (also referred to herein as an ion-conducting polymer interposer or a polymer interposer) to form a hybrid solid-state electrolyte, the ion conduction between the ceramic membrane and ion-conducting polymer is reduced by the presence of interfacial resistance, which ultimately results in large overpotential during electrochemical cycling. This is increasingly evident when the particle size involved in the preparation of a single-thick membrane is less than 32 μm in size since smaller particles introduce more surface area for ion conduction at the ceramic-polymer interface.

Embodiments of the present invention reduce interfacial resistance, and in turn, reduce overpotential during electrochemical cycling, which currently results when an ion-conducting polymer is integrated with a ceramic composite membrane to form a hybrid solid-state electrolyte. Embodiments of the present invention recognize that a reduction in interfacial resistance between the ceramic and polymer layers can be achieved by introducing a solvent that can loosely bind with the polymer to harvest lithium ions. By pre-wetting the ceramic composite membrane with a solvent prior to applying the ion-conducting polymer, a significant reduction in interfacial resistance, lower overpotential, stable lithium plating and stripping during electrochemical cycling, and improved battery performance is achieved.

In various embodiments of the present invention, a hybrid solid-state electrolyte for secondary batteries is fabricated by introducing a loosely bound organic liquid interface between an ion-conducting polymer and an ion-conducting membrane. In an embodiment, the ion-conducting membrane is an inorganic membrane. In an embodiment, the ion-conducting membrane is a ceramic composite membrane. A hybrid solid-state electrolyte is assembled by layering the polymer interposer on the top and bottom surfaces of the pre-wet ion-conducting membrane. In an embodiment, to obtain a better or smoother interface between the ion-conducting membrane and the polymer interposer, in-situ polymerization of a pre-polymer is performed during assembly of the hybrid solid-state electrolytes by applying one or more of ultraviolet (UV) or visible light, heat, microwaves, ultrasound, or the like to form an ion-conducting polymer. The ion-conducting membrane, in combination with the ion-conducting polymer, provides a hybrid solid-state electrolyte.

According to various embodiments of the present invention, an inorganic ion-conducting membrane is pre-wet with an organic liquid solution. As used herein, pre-wetting shall mean wetting or otherwise applying the organic liquid solution to the inorganic ion-conducting membrane prior to wetting or otherwise applying an ion-conducting polymer or ion-conducting polymer precursor on top of the organic liquid solution. In an embodiment, a ceramic composite membrane is pre-wet with an organic liquid solution containing a salt that releases the metal ions. A polymer ion conducting material is then applied onto the surface of the pre-wet ceramic composite membrane. In an alternate embodiment, an ion-conducting polymer precursor is applied to the surface of the pre-wet ceramic composite membrane. In an embodiment, if a precursor of an ion-conducting polymer is used, heat is applied to cure the ion-conducting polymer precursor to form an ion-conducting polymer.

Suitable classes of organic liquids for pre-wetting the ion-conducting membrane include, but are not limited to, carbonate-based, ethereal-based, and nitrile-based compounds. The organic liquids can be sourced from commercially available products or can be prepared in-house. In some embodiments, a desired concentration of an ion conducting salt is dissolved in a highly pure, moisture-free organic liquid solvent. The ion-conducting membrane is pre-wet with the organic liquid solution containing the ion-conducting salt. The ion-conducting salt can be selected from the group consisting of, but not limited to, lithium hexafluorophosphate ($LiPF_6$), lithiumperchlorate ($LiClO_4$), lithium nitrate ($LiNO_3$), lithium bistrifluoromethylsulfonyl imide ($Li(CF_3SO_2)_2N$)), lithium hexafluoroarsenate ($LiAsF_6$), lithium tetrafluoroborate ($LiBF_4$), lithium trifluoromethanesulfonate ($LiCF_3SO_3$), lithium bis(trifluoromethanesulfonyl)imide (LiTFSI), and combinations thereof.

Figure 1:
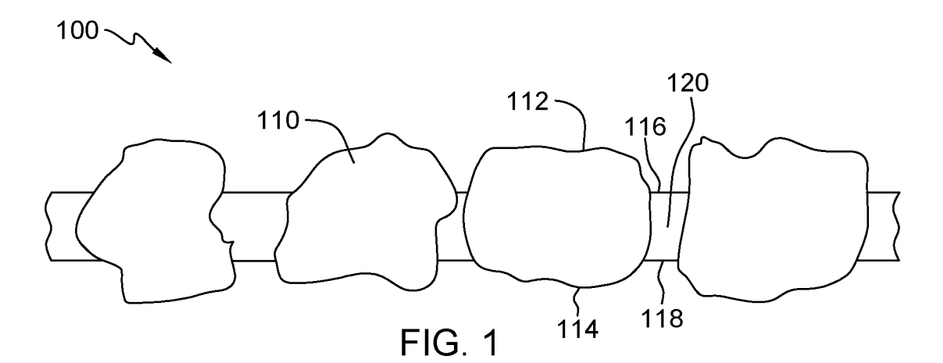
FIG. 1 is a schematic, cross-sectional view of an ion-conducting membrane in accordance with at least one embodiment of the present invention.

FIG. 1 is a schematic, cross-sectional view of an ion-conducting membrane 100 that may be incorporated into a solid-state electrolyte or a hybrid solid-state electrolyte. In various embodiments, ion-conducting membrane 100 is an inorganic ion-conducting membrane, such as a ceramic composite membrane. Ion-conducting membrane 100 includes ion-conducting ceramic particles 110 and an insulating polymeric binder 120. Ion-conducting ceramic particles include a first major surface 112 and an opposing, second major surface 114. First major surface 112 and opposing, second major surface 114 are those portions of the surfaces of ion-conducting ceramic particles 110 that extend above and below (or otherwise do not come in contact with) insulating polymeric binder 120. Insulating polymeric binder 120 includes a first major surface 116 and an opposing, second major surface 118. First major surface 116 and opposing, second major surface 118 include those portions of the surfaces of polymeric binder 120 located in between first major surface 112 and second major surface 114 of ion-conducting ceramic particles 110.

In some embodiments, ion conducting membrane 100 includes a contiguous solid structure of fused or sintered ion-conducting ceramic particles 110. In other embodiments, ion-conducting ceramic particles 110 may be linked by an optional insulating polymeric binder 120, wherein at least a portion of ion-conducting ceramic particles 110 extend from first major surface 116 and second major surface 118 of insulating polymeric binder 120. In an embodiment, ion-conducting ceramic particles 110 of ion-conducting membrane 100 form a single layer. In various embodiments, which are not intended to be limiting, the thickness of ion-conducting membrane 100 is about 0.1 microns to about 100 microns.

In various embodiments, insulating polymeric binder 120 may be chosen from, for example, cyclo-olefin polymers, poly-para-xylylenes, benzocyclobutenes, olefin addition polymers, olefin addition copolymers, ring opening metathesis polymers and reduced forms thereof, fluorocarbon addition polymers, fluoroether polymers, cyclobutyl fluoroethers, polyarylenes, polyarylene ethers, polybenzoazoles, polysiloxanes, silsequioxanes, polycarvosilanes, and any combinations thereof. In an embodiment, insulating polymeric binder 120 is selected such that ion-conducting membrane 100 is flexible.

In various embodiments, ion-conducting ceramic particles 110 have an elastic modulus of greater than about 6 GPa. In an embodiment, a shear modulus greater than 6 GPa may suppress dendrite formation on the surface of a metallic electrode and prevent dendrite penetration into ion-conducting membrane 100. More specifically, a shear modulus greater than double the shear modulus of Li, wherein the shear modulus of Li is 3.4 GPa, may efficiently suppress dendrite growth. In various embodiments, ion-conducting ceramic particles 110 may be chosen from, for example, LiPON, LISICON ($Li_{14}Zn(GeO_4)_4$), LAGP ($Li_{1.5}Al_{0.5}Ge_{1.5}(PO_4)_3$), LATP ($Li_{1.3}Al_{0.3}Ti_{1.7}(PO_4)_3$), LATTP ($Li_{1.6}Al_{0.5}Ti_{0.95}Ta_{0.5}(PO_4)_3$), LLZO ($Li_7La_3Zr_2O_{12}$), Li-β-alumina, doped $Li_3N$, $Li_2S$—$SiS_2$—$Li_3PO_4$, $Li_7P_3S_{11}Li_2S$—$P_2S_5$, $Li_{10}GeP_2S_{12}$ and mixtures and combinations thereof.

Figure 2:
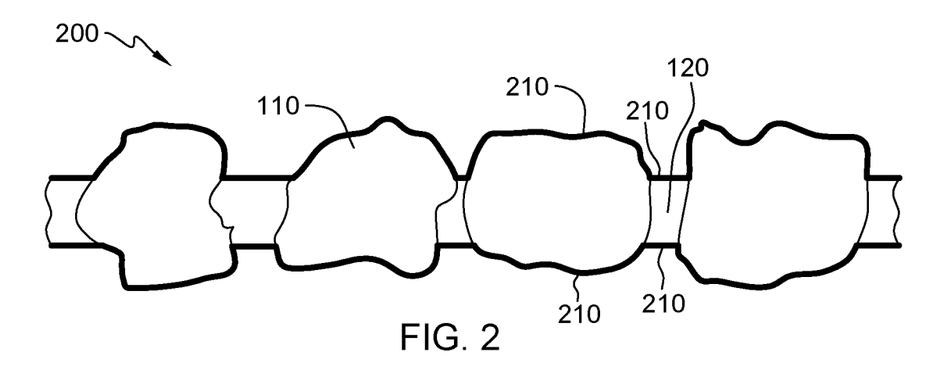
FIG. 2 is a schematic, cross-sectional view of an ion-conducting membrane after pre-wetting the ion-conducting membrane of FIG. 1 with an organic liquid solution in accordance with at least one embodiment of the present invention.

FIG. 2 is a schematic, cross-sectional view of an ion-conducting membrane 200 after pre-wetting ion-conducting membrane 100 of FIG. 1 with an organic liquid solution. Ion-conducting membrane 200 includes ion-conducting ceramic particles 110 and insulating polymeric binder 120.

As further depicted in FIG. 2, ion-conducting membrane 200 includes a layer of organic liquid solution 210. In some embodiments, layer of organic liquid solution 210 is applied to ion-conducting membrane 100 such that at least first major surface 112 and second major surface 114 of ion-conducting ceramic particles 110 (as shown in FIG. 1) are covered by layer of organic liquid solution 210. In other embodiments, layer of organic liquid solution 210 is applied to ion-conducting membrane 100 such that first major surface 112 and second major surface 114 of ion-conducting ceramic particles 110, and first major surface 116 and second major surface 118 of insulating polymeric binder 120 extending between ion-conducting ceramic particles 110 (as shown in FIG. 1) are covered by layer of organic liquid solution 210.

In an embodiment, a highly controlled ultrasonic spray nozzle is used to apply the required quantity of layer organic liquid solution 210. In some embodiments, a desired concentration of an ion conducting salt is dissolved in a highly pure, moisture-free organic liquid solvent. The ion-conducting salt can be selected from the group consisting of, but not limited to, lithium hexafluorophosphate ($LiPF_6$), lithium perchlorate ($LiClO_4$), lithium nitrate ($LiNO_3$), lithium bistrifluoromethylsulfonyl imide ($Li(CF_3SO_2)_2N$)), lithium hexafluoroarsenate ($LiAsF_6$), lithium tetrafluoroborate ($LiBF_4$), lithium trifluoromethanesulfonate ($LiCF_3SO_3$), lithium bis(trifluoromethanesulfonyl)imide (LiTFSI), and combinations thereof.

Figure 3:
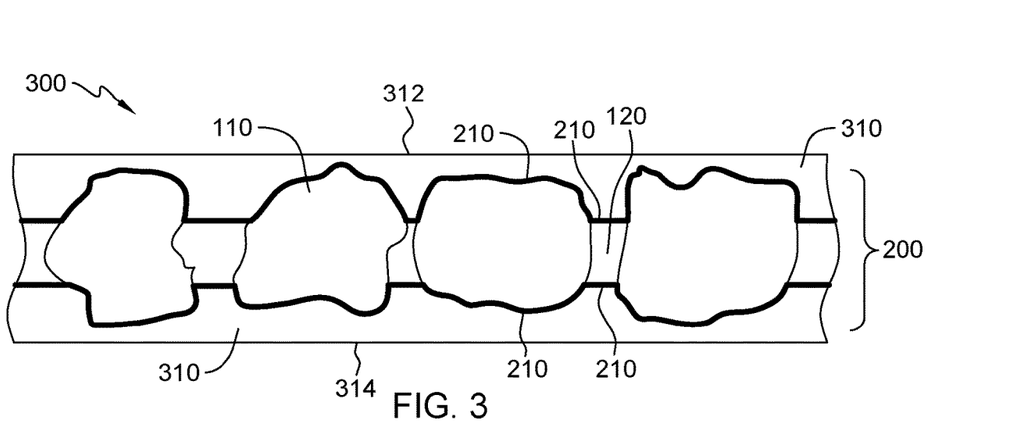
FIG. 3 is a schematic, cross-sectional view of a hybrid solid-state electrolyte formed by surrounding the ion-conducting membrane of FIG. 2 with an ion-conducting polymer in accordance with at least one embodiment of the present invention.

FIG. 3 depicts an example of a hybrid solid-state electrolyte 300 including ion-conducting membrane 200 (as depicted in FIG. 2) surrounded by an ion-conducting polymer 310. As further depicted in FIG. 3, ion-conducting polymer 310 has been applied over ion-conducting membrane 100 pre-wet with organic liquid solution 210. In various embodiments, ion-conducting polymer 310 may be chosen from, for example, linear polymers, crosslinked polymers, star polymers, and block copolymers. In an embodiment, which is not intended to be limiting, ion-conducting polymer 310 may have a glass transition temperature ($T_g$) lower than the device operation temperature.

In an embodiment, ion-conducting polymer 310 includes a compound that releases Li-ions, such as a Li-salt. Suitable Li-salts include, but are not limited to, lithium hexafluoroarsenate ($LiAsF_6$), lithium perchlorate ($LiClO_4$—), lithium hexafluorophosphate ($LiPF_6$), lithium tetrafluoroborate ($LiBF_4$), lithium trifluoromethanesulfonate ($LiCF_3SO_3$), lithium nitrate, and lithium bis(trifluoromethanesulfonyl) imide (LiTFSI). In alternative embodiments, ion-conducting polymer 310 can include other compounds that release different types of salts (e.g., Na ion-releasing salts or Mg ion-releasing salts). The type of salts may be chosen based on the battery chemistry and/or the types of anodes/cathodes used to form the battery. Preferably, the same type of salt is used in both ion-conducting polymer 310 and layer of organic liquid solution 210.

In an embodiment, ion-conducting polymer 310 includes an ionic liquid, which as used in this application refers to an ionic, salt-like material that is liquid below a temperature of about 100° C. and has a melting point below room temperature, or below about 20° C., or below about 0° C. Suitable ionic liquids include, but are not limited to, 1-methyl-1-propyl piperidinium bis(trifluoromethylsulfonyl)imide, 1-butyl-1-methyl piperidinium bis(trifluoromethylsulfonyl) imide, 1-ethyl-1-methylpyrrolidinium tetrafluoroborate, 1-methyl-1-propylpyrrolidinium tetrafluoroborate, 1-butyl-1-methylpyrrolidinium tetrafluoroborate, 1-ethyl-1-methylpyrrolidinium bis(trifluoromethylsulfonyl)imide, 1-methyl-1-propylpyrrolidinium bis(trifluoromethyl sulfonyl)imide, 1-butyl-1-methylpropylpyrrolidinium bis(trifluoromethylsulfonyl)imide, 1-ethyl-3-methylimidazolium-bis(trifluoromethylsulfonyl)imide, 1-methyl-3-propylimidazolium-bis(trifluoromethylsulfonyl)imide, 1-butyl-3-methylimidazolium-bis(trifluoromethylsulfonyl) imide, 1-ethyl-3-methylimidazolium-tetrafluoroborate, 1-methyl-3-propyllimidazolium-tetrafluoroborate, 1-butyl-3-methylimidazolium-tetrafluoroborate, and 1-propyl-3-methylpyridinium-bis(trifluoromethylsulfonyl)imide.

In some embodiments, ion-conducting polymer 310 may include an optional inorganic filler. In an embodiment, the inorganic filler may help reinforce ion-conducting polymer 310, which may be soft. In an embodiment, the inorganic filler may also enhance the shear modulus of ion-conducting polymer 310. In an embodiment, the inorganic filler acts as a reinforcing filler and has multiple sites available for crosslinking. Suitable inorganic fillers may be chosen from, but are not limited to, carbon nanotubes, silica nanoparticles, POSS compounds, metal oxides, and combinations thereof.

In an embodiment, ion-conducting polymer 310 is a thin film surrounding layer of organic liquid solution 210. In an embodiment, ion-conducting polymer 310 has a lower conductivity than ion-conducting membrane 100, but if ion-conducting polymer 310 is sufficiently thin, the high conductance of ion-conducting membrane 100 is not significantly impacted by the lower conductance of ion-conducting polymer 310. Further, a thinner ion-conducting polymer 310 reduces inter-particle interfacial resistance between the ion-conducting ceramic particles 110 and an electrode. In an embodiment, ion-conducting polymer 310 includes two planar surfaces 312, 314, which can provide good interfacial contact with an electrode, if in direct contact with the electrode.

In various embodiments, hybrid solid-state electrolyte 300 may have an ionic conductivity of at least $10^{-7}$ S/cm measured at room temperature, or at least $10^{-4}$ S/cm measured at room temperature.

Figure 4:
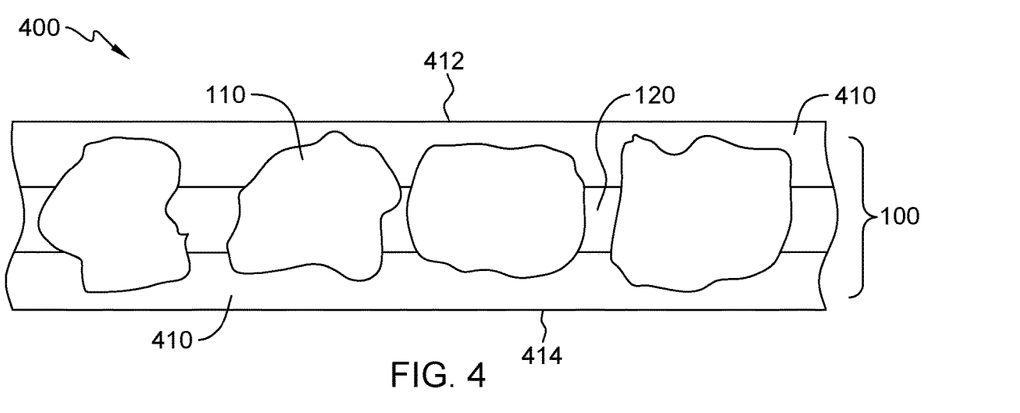
FIG. 4 is a schematic, cross-sectional view of a hybrid solid-state electrolyte formed by surrounding the ion-conducting membrane of FIG. 1 with an ion-conducting polymer in accordance with at least one embodiment of the present invention.

FIG. 4 depicts an example of a hybrid solid-state electrolyte 400 including ion-conducting membrane 100 (as depicted in FIG. 1) surrounded by ion-conducting polymer 410. It should be noted that hybrid solid-state electrolyte 400 of FIG. 4 was not pre-wet with an organic liquid solution prior to surrounding ion-conducting membrane 100 with ion-conducting polymer 410. For purposes of this disclosure, hybrid-solid state electrolyte 400 may be referred to as the "control cell" or "control."

As further depicted in FIG. 4, ion-conducting polymer 410 has been applied directly over ion-conducting membrane 100. In various embodiments, ion-conducting polymer 410 may be chosen from, for example, linear polymers, crosslinked polymers, star polymers, and block copolymers. In an embodiment, which is not intended to be limiting, ion-conducting polymer 410 may have a glass transition temperature ($T_g$) lower than the device operation temperature.

In an embodiment, ion-conducting polymer 410 includes a compound that releases Li-ions, such as a Li-salt. Suitable Li-salts include, but are not limited to, lithium hexafluoroarsenate ($LiAsF_6$), lithium perchlorate ($LiClO_4$—), lithium hexafluorophosphate ($LiPF_6$), lithium tetrafluoroborate ($LiBF_4$), lithium trifluoromethanesulfonate ($LiCF_3SO_3$), lithium nitrate, and lithium bis(trifluoromethanesulfonyl) imide (LiTFSI). In alternative embodiments, ion-conducting polymer 410 can include other compounds that release different types of salts (e.g., Na ion-releasing salts or Mg ion-releasing salts). The type of salts may be chosen based on the battery chemistry and/or the types of anodes/cathodes used to form the battery.

In some embodiments, ion-conducting polymer 410 may include an optional inorganic filler. In an embodiment, the inorganic filler may help reinforce ion-conducting polymer 410, which may be soft. In an embodiment, the inorganic filler may also enhance the shear modulus of ion-conducting polymer 410. In an embodiment, the inorganic filler acts as a reinforcing filler and has multiple sites available for crosslinking. Suitable inorganic fillers may be chosen from, but are not limited to, carbon nanotubes, silica nanoparticles, POSS compounds, metal oxides, and combinations thereof.

In an embodiment, ion-conducting polymer 410 is a thin film surrounding ion-conducting membrane 100. In an embodiment, ion-conducting polymer 410 has a lower conductivity than ion-conducting membrane 100, but if ion-conducting polymer 410 is sufficiently thin, the high conductance of ion-conducting membrane 100 is not significantly impacted by the lower conductance of ion-conducting polymer 410. Further, a thinner ion-conducting polymer 410 reduces inter-particle interfacial resistance between the ion-conducting ceramic particles 110 and an electrode. In an embodiment, ion-conducting polymer 410 includes two planar surfaces 412, 414, which can provide good interfacial contact with an electrode, if in direct contact with the electrode.

Figure 5:
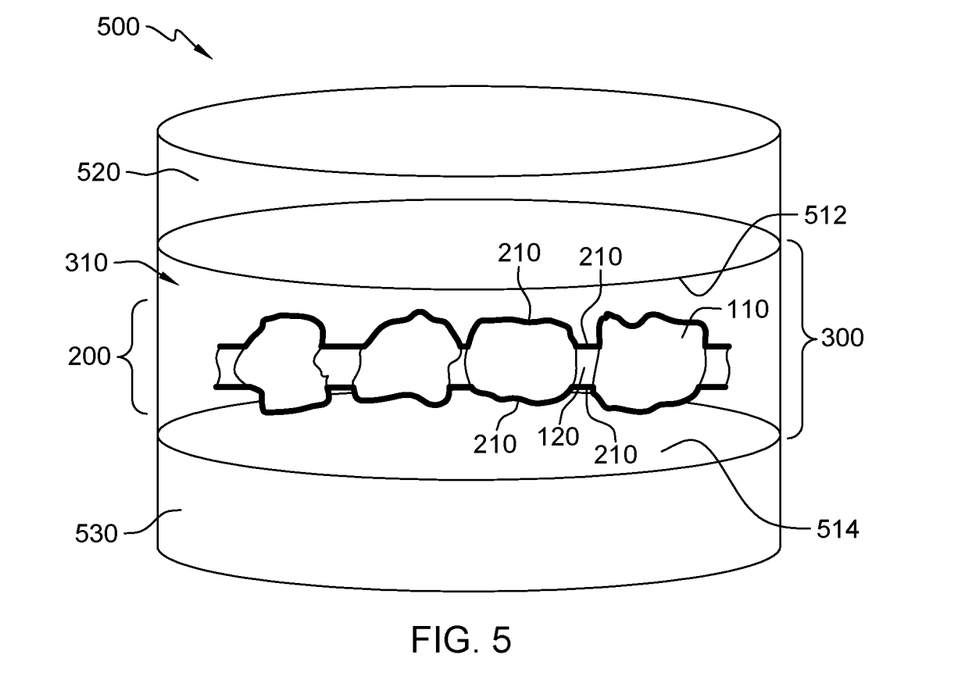
FIG. 5 is a schematic, cross-sectional view of an energy storage device formed, in part from, the hybrid solid-state electrolyte of FIG. 3 in accordance with at least one embodiment of the present invention.

FIG. 5 illustrates an energy storage device 500 formed, in part from, hybrid solid-state electrolyte 300 (as depicted in FIG. 3). Hybrid solid-state electrolyte 300 has a first surface 512 and a second surface 514. In an embodiment, first surface 512 and second surface 514 are substantially planar. Energy storage device 500 further includes a first solid electrode 520 and a second solid electrode 530. As depicted in the embodiment of FIG. 5, first solid electrode 520 directly contacts first surface 512 of hybrid solid-state electrolyte 300, and second solid electrode 530 directly contacts second surface 514 of hybrid solid-state electrolyte 300. However, in other embodiments, direct interfacial contact is not required. In an embodiment, which is not intended to be limiting, first solid electrode 520 is an anode, and second solid electrode 530 is a cathode.

In various embodiments, first solid electrode 520 may be chosen from, for example, Li-intercalating graphitic anodes, lithium titanate (LTO), silicon, and metallic Li-anodes. In an embodiment, metallic Li-anodes may provide a specific anode capacity almost 10 times larger than that of an Li-intercalating graphitic anode, and metallic Li-anodes may further maximize the overall energy density of energy storage device 500. In alternative embodiments, first solid electrode 520 may be chosen from other metallic anodes including, but not limited to, zinc (Zn), Magnesium (Mg), Sodium (Na), and intercalation hosts of these metallic ions.

In various embodiments, the average distance between first solid electrode 520 and ion-conducting membrane 100 may be less than about 10 microns, less than about 5 microns, less than about 1 micron, or less than about 0.2 micron. In various embodiments, the average distance between second solid electrode 530 and ion-conducting membrane 100 may also be less than about 10 microns, less than about 5 microns, less than about 1 micron, or less than about 0.2 micron.

In an embodiment, ion-conducting polymer 310 may be selected from pressure deformable materials, which may accommodate volume changes that may occur in energy storage device 500. For example, volume changes may occur during charge or discharge cycles in either or both electrodes, or may occur during various applications of energy storage device 500. For example, a Li-ion battery including a solid-state electrolyte and/or hybrid solid-state electrolyte of the present invention may be used as a rechargeable battery for a cell phone. If a user of the cell phone were to sit down with the cell phone in his or her pants pocket, the volume of the Li-ion battery could change upon the increase in pressure on the cell phone. A pressure deformable ion-conducting polymer 310 may allow for volume changes to hybrid solid-state electrolyte 300 without causing damage to energy storage device 500 or ion-conducting membrane 100, which is referred to herein as a cushioning effect.

In an embodiment, ion-conducting polymer 310 of hybrid solid state electrolyte 300 may also allow metallic Li-electrodes or the like to be used in energy storage device 500 in place of Li-intercalating graphitic electrodes. In an embodiment, ion-conducting polymer 310 may be selected from materials that are electrochemically stable when in contact with a metallic electrode, whereas ion-conducting membrane 100 (more specifically ion-conducting ceramic particles 110 in ion-conducting membrane 100) may be selected from materials that are not electrochemically stable with metallic electrodes. As used herein, electrochemically stable refers to a material that will not substantially react when placed in contact with a metallic electrode material.

Materials that are electrochemically unstable with metallic electrodes may have a higher conductance than those that are stable with metallic electrodes. Therefore, an electrochemically unstable material for ion-conducting membrane 100 may provide hybrid solid-state electrolyte 300 with a desired conductance, while an electrochemically stable ion-conducting polymer 310 surrounding ion-conducting membrane 100 can make possible the use of metallic electrodes in contact with the hybrid solid-state electrolyte 300.

Figure 6:
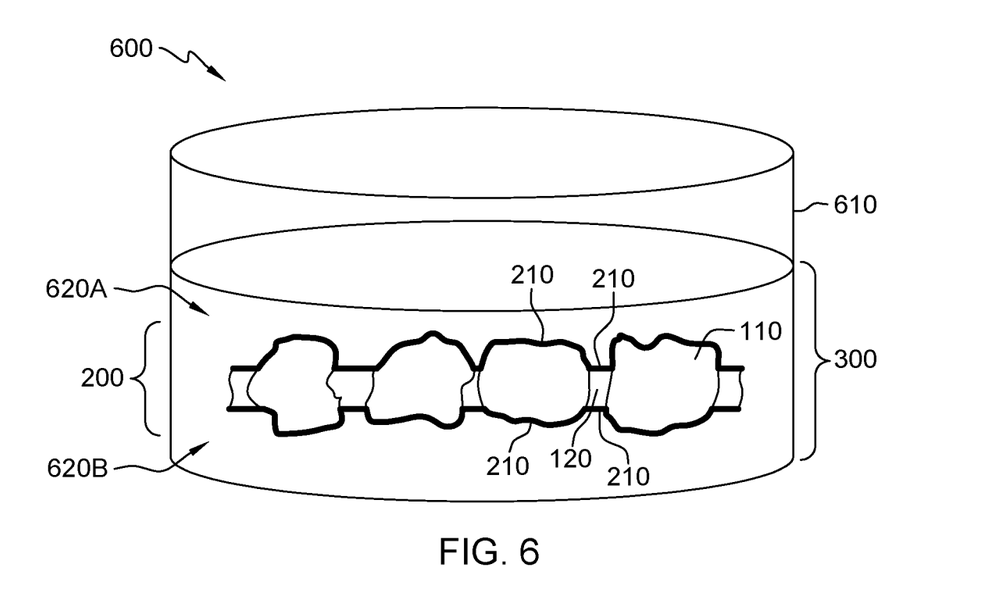
FIG. 6 is a schematic, cross-sectional view of an apparatus that may be used to make the hybrid solid-state electrolyte of FIG. 3 in accordance with at least one embodiment of the present invention.

FIG. 6 is a schematic illustration of an apparatus 600 that may be used to make hybrid solid-state electrolyte 300 suitable for use in, for example, an energy storage device such as a Li-ion battery. Apparatus 600 includes a mold 610 to shape hybrid solid-state electrolyte 300. Mold 610 retains a pre-polymer mixture 620A, which may be polymerized to form ion-conducting polymer 620B.

In an embodiment, pre-polymer mixture 620A includes polymerizable compounds, a metallic-salt, a polymerization initiator, and an optional ionic liquid. The metallic salt may be selected based on the type of energy storage device being generated (e.g., Li-salt for a lithium-battery, Na-salt for a sodium battery, and Mg-salt for a magnesium battery). The polymerizable compounds of pre-polymer mixture 620A may be chosen from monomers, oligomers or mixtures and combinations thereof, any of which can form linear polymers, branched polymers, crosslinked polymers, star polymers, block copolymers, and mixtures and combinations thereof.

The polymerization of the compounds in pre-polymer mixture 620A may be performed under curing conditions after pre-polymer mixture 620A is applied over an ion-conducting membrane pre-wet with an organic liquid solution. The curing conditions may include one or more of ultraviolet (UV) or visible light, heat, microwaves, ultrasound, or the like. In an embodiment, the polymerization could instead be performed, in-situ, during assembly of hybrid solid-state electrolytes in an energy storage device, such as energy storage device 500.

The polymerization results in a thin, pressure-deformable ion-conducting polymer 620B surrounding an ion-conducting membrane pre-wet with an organic liquid solution. The resulting construction forms a hybrid solid-state electrolyte, such as hybrid solid-state electrolyte 300 depicted in FIG. 3, with a desired shape for a particular application.

Figure 7:
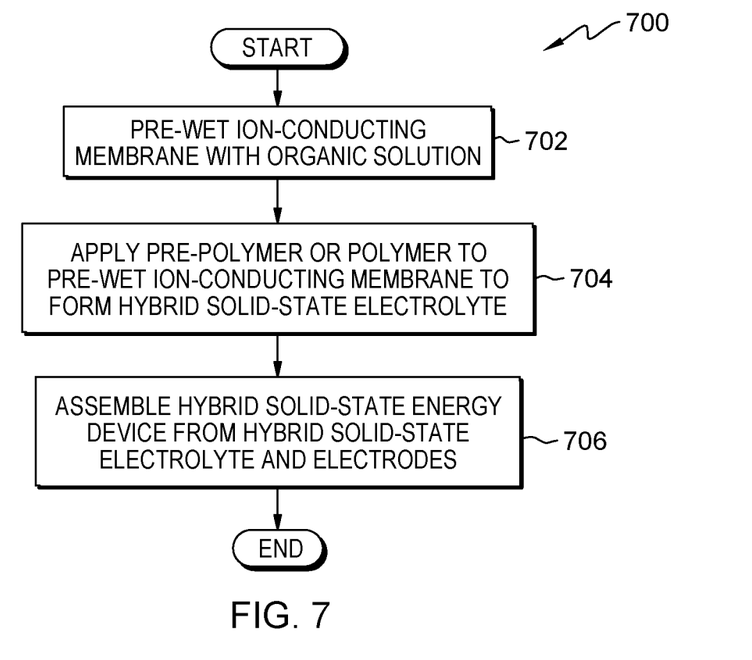
FIG. 7 is a flowchart depicting operational steps for making an energy storage device in accordance with at least one embodiment of the present invention.

FIG. 7 is a flowchart, generally designated 700, depicting operational steps for making an energy storage device in accordance with at least one embodiment of the present invention. At step 702, ion-conducting membrane 100 is pre-wet with an organic liquid solution. At step 704, a pre-polymer (formed by Procedure 2) or polymer is applied to ion-conducting membrane 100 pre-wet with the organic liquid solution to form hybrid solid-state electrolyte 300. At step 706, a hybrid solid-state energy storage device, such as energy storage device 500, is assembled from solid-state electrolyte 300, first solid electrode 520, and second solid electrode 530. In an embodiment, if a pre-polymer is used, the pre-polymer is cured by heat to form a polymer after cell assembly.

First Procedure
Fabrication of Ion-Conducting Membrane

Ion-conducting membranes were fabricated using the process described in U.S. Pat. No. 9,520,627B2, which is incorporated herein by reference in its entirety. An ethanol soluble adhesive tape, with adhesive side facing up, was attached to a silicon wafer and used as a substrate. The substrate was annealed at 75° C. for 5 minutes to ensure the surface was flat and free of wrinkles. Li-ion conducting glass ceramic LICGC™ particles ($Li_2O$—$Al_2O_3$—$SiO_2$—$P_2O_5$—$TiO_2$) were used as the ion-conducting ceramic particles (from Ohara Corp., Rancho Santa Margarita, Calif.). The Li-ion conducting glass ceramic particles have an ionic conductivity of $1.0-10^{-4}$ S/cm at room temperature. The Li-ion conducting glass ceramic particles within the size range of 25 μm to 32 μm were scattered on the adhesive tape. The substrate was then shaken to distribute the unattached ion-conducting ceramic particles to form a single layer, ion-conducting ceramic particle film with a high packing density. A 10 wt % solution of cyclo-olefin polymer (available under the trade designation Zeonor 1430 from Zeon Corp., Japan) in decalin was coated on the ion-conducting ceramic particles using a draw down coating application with a 20 μm gate opening.

To form a continuous polymer matrix around the particles, the solvent was largely removed by heating the coated ion-conducting ceramic particles on the substrate at 70° C. for 3 hours. Then, the adhesive tape was removed by submerging the substrate into ethanol at 70° C. overnight, which resulted in the bottom part of the ion-conducting membrane being exposed. The excess polymer on the top surfaces of the ion-conducting ceramic particles was removed by etching in a dry reactive oxygen plasma (MARCH).

Second Procedure
Preparation of Ion-Conducting Pre-polymer Mixture Including Crosslinked PEG System A pre-polymer mixture to form a crosslinked PEG ion-conducting polymer was prepared by mixing a 10 to 1 molar ratio of poly(ethylene glycol) methyl ether acrylate (PEGMA, molecular weight=480) to Methacryl polyoctahedral silsesquioxanes (Methacryl POSS, formula weight=1433.97). Then, Lithium Bis(trifluoromethylsulfonyl)imide (LiTFSI), as the Li-salt, was added with the molar ratio of EO/Li=20/1, wherein EO is a repeating number of ethylene oxide units in the PEGMA. Finally, 1 wt % to the total mass of PEGMA and Methacryl POSS as an initiator (Azobisisobutyronitrile for thermal curing) was added to the system. The pre-polymer mixture preparation was performed inside a dry argon glove box at room temperature. The pre-polymer mixture was stirred until a homogenous solution was obtained, generally for 7 to 8 hours.

Third Procedure
Integrating Single-Particle Thick Membrane with Ion-Conducting Interposer Polymer For ease of testing, the ion-conducting membrane (formed by Procedure 1) was cut into a 15 mm disc. The disc was cleaned and dried at 70° C. before testing. The cut disc of the ion-conducting membrane (formed by Procedure 1) was subjected to an organic liquid treatment (as a wetting agent) formed, for example, by mixing an organic solvent with Lithium Bis(trifluoromethylsulfonyl)imide salt until the concentration reaches 1M). 1-2 μL/cm² of a desired wetting agent was spread evenly throughout the surface of the disc until the liquid wets the entire disc. The pre-polymer mixture (formed by Procedure 2) was applied directly on both sides of the disc and placed between two lithium electrodes. Further, additional layers were packed into a coin cell, such as a CR2032 coin cell. The coin cell was then heated at 70° C. overnight for in-situ polymerization.

Example 1

Hybrid Solid-State Electrolyte Prepared with Ion-Conducting Membrane Wet by Tetraglyme The ion-conducting membrane (formed by Procedure 1) was pre-wet with an organic liquid solution comprising 1M LiTFSI in tetraethylene glycol dimethyl ether. 1-2 μL/cm² of the organic liquid solution was spread evenly over a 15 mm disc sliced from the ion-conducting membrane (formed by Procedure 1). Then, a pre-polymer mixture (formed by Procedure 2) was applied over the organic liquid solution, and the disc was placed between two lithium electrodes and packed into a coin cell (e.g., CR2032) as described in the Procedure 3. The coin cell was then heated at 70° C. overnight for in-situ polymerization of the pre-polymer mixture.

Example 2

Hybrid Solid-State Electrolyte Prepared with Ion-Conducting Membrane Wet by Succinonitrile The ion-conducting membrane (formed by Procedure 1) was pre-wet with an organic liquid solution comprising 1M LiTFSI in succinonitrile as a wetting agent. 1-2 µL/cm² of the organic liquid solution was spread evenly over a 15 mm disc sliced from the ion-conducting membrane (formed by Procedure 1). Then, a pre-polymer mixture (formed by Procedure 2) was applied over the organic liquid solution, and the 15 mm disc was placed between two lithium electrodes and packed into a coin cell (e.g., CR2032) as described in the Procedure 3. The coin cell was then heated at 70° C. overnight for in-situ polymerization of the pre-polymer mixture.

Example 3

Hybrid Solid-State Electrolyte Prepared with Ion-Conducting Membrane Wet by Dimethyl Carbonate The ion-conducting membrane (formed by Procedure 1) was pre-wet with an organic liquid solution comprising 1M LiTFSI in dimethyl carbonate. 1-2 µL/cm² of the organic liquid solution was spread evenly over a 15 mm disc sliced from the ion-conducting membrane (formed by Procedure 1). Then, a pre-polymer mixture (formed by Procedure 2) was applied over the organic liquid solution, and the 15 mm disc was placed between two lithium electrodes and packed into a coin cell (e.g., CR2032) as described in the Procedure 3. The coin cell was then heated at 70° C. overnight for in-situ polymerization of the pre-polymer mixture.

Comparative Example 1—Control Sample

Figure 9A:
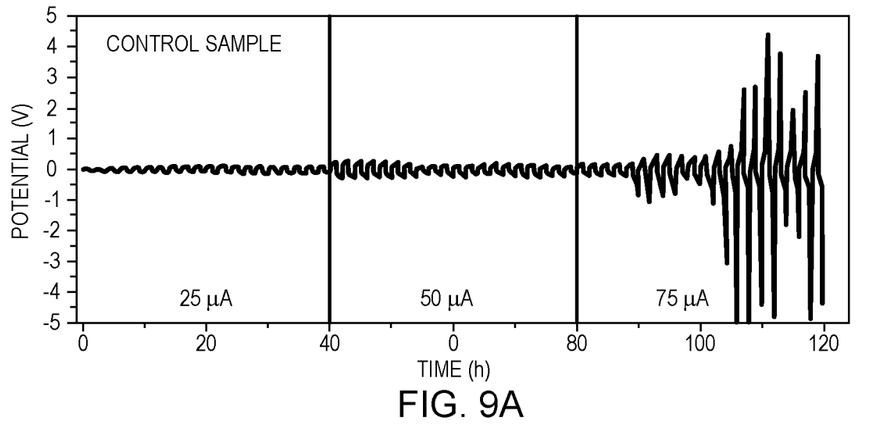
FIG. 9A is plot of the cycling performance of an Li—Li symmetrical cell without pre-wetting the ion-conducting membrane with an organic liquid solution.

Hybrid Solid-State Electrolyte Prepared with Ion-Conducting Membrane without Pre-Wetting A pre-wetting agent formed from an organic solvent mixed with Lithium Bis(trifluoromethylsulfonyl)imide salt and having a concentration of 1M was not applied to a 15 mm disc sliced from ion-conducting membrane (formed by Procedure 1). A pre-polymer interpose polymer (formed by Procedure 2) was applied directly over the 15 mm disc, and the disc was placed between two lithium electrodes and packed into a coin cell (e.g., CR2032). The coin cell was then heated at 70° C. overnight for in-situ polymerization of the pre-polymer mixture. As depicted by FIG. 9A, the control sample exhibited unstable cycling with an overpotential reaching 5V at 75 µA.

Comparative Example 2—Dimethoxyethane

Figure 9B:
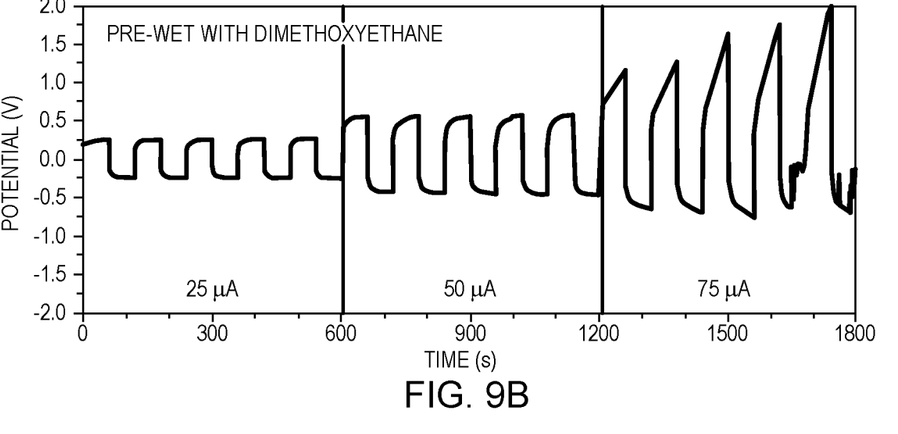
FIG. 9B is a plot of the cycling performance of an Li—Li symmetrical cell pre-wet with dimethoxyethane.

Hybrid Solid-State Electrolyte Prepared with Ion-Conductive Membrane Wet by Low Boiling Dimethoxyethane Solvent An ion-conducting membrane (formed by Procedure 1) was pre-wet with an organic liquid solution of 1M LiTFSI in dimethoxyethane. 1-2 µL/cm² of the organic liquid solution of 1M LiTFSI in dimethoxyethane was spread evenly over a 15 mm disc cut from the ion conducting membrane (formed by Procedure 1). Next, a pre-polymer mixture (formed by Procedure 2) was applied over the organic liquid solution. Lastly, the 15 mm disc was placed between two lithium electrodes and packed into a coin cell (e.g., CR2032) and heated at 70° C. for in-situ polymerization of the pre-polymer mixture. As depicted by FIG. 9B, the sample pre-wet with dimethoxyethane shows relatively high overpotential reaching up to 2V at 75 µA. It should be noted that the low boiling point of dimethoxyethane may have led to pre-mature evaporation of the solvent, leaving voids between the single-particle thick ion-conducting membrane and ion-conducting polymer, which ultimately led to high resistance and high overpotential during electrochemical cycling.

Interfacial Resistance Example

To demonstrate the effect that pre-wetting the ion-conducting membrane with an organic liquid solution prior to surrounding the ion-conducting membrane with an ion-conducting polymer has on reducing interfacial resistance, four Li—Li symmetric cells (a Control cell from Comparative Example 1 that was not pre-wet with any organic liquid solution, and cells from Example 1, Example 2, and Example 3 pre-wet with a different respective organic liquid solution) were tested using electrochemical impedance spectroscopy (EIS) at room temperature. Several small signal (V=10 mV) AC impedance measurements were performed on a VMP3 impedance analyzer available from BioLogic Science Instruments, Seyssinet-Pariset, France, using sinusoidal AC waveforms. The frequency of the sinusoidal AC waveforms ranged from about 100 mHz to about 1 MHz. The interfacial resistance was calculated by subtracting the bulk resistance from the total resistance obtained from the EIS measurement.

Figure 8:
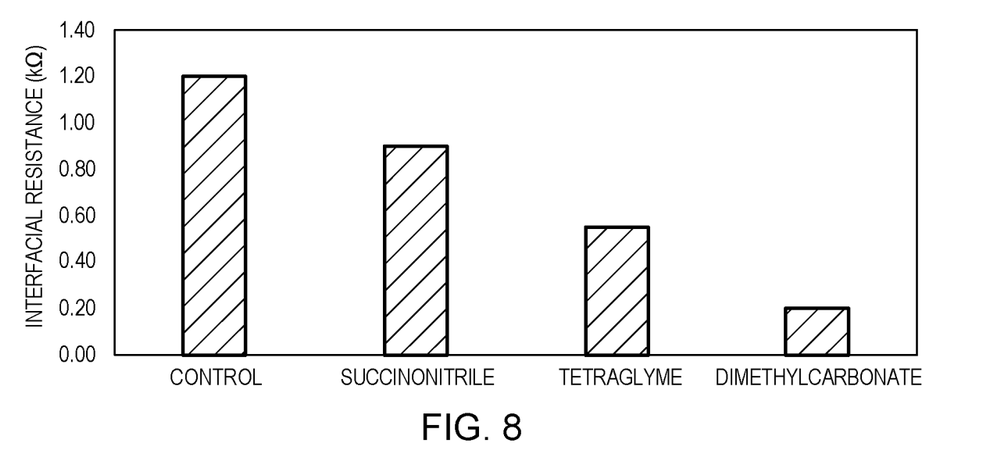
FIG. 8 is a plot of the interfacial resistance of Li—Li symmetrical cells assembled from hybrid solid-state electrolytes without and with pre-wetting the ion-conducting membrane with an organic liquid solution.

As depicted by FIG. 8, the Li—Li symmetric cell of Example 2 pre-wet with the nitrile compound (succinonitrile) reduced the interfacial resistance by 30% when compared to the interfacial resistance produced by the Control cell. The Li—Li symmetric cell of Example 1 pre-wet with the ethereal compound (tetraglyme) reduced the interfacial resistance by 50% when compared to the interfacial resistance produced by the Control cell. Lastly, the Li—Li symmetric cell of Example 3 pre-wet with the carbonate solvent (dimethyl carbonate) reduced the interfacial resistance by 80% when compared to the interfacial resistance produced by the Li—Li symmetric Control cell.

It should be noted, however, that the electrochemical stability of the Li—Li symmetric cell of Example 3 pre-wet with dimethyl carbonate was limited to less than 4V, and thus, may present a problem when constructing a battery with high voltage cathodes. On the other hand, the electrochemical stability of the Li—Li symmetric cells of Example 1 and Example 2 pre-wet with tetraglyme and succinonitrile, respectively, was greater than 4.5V and thus, may be better suited for constructing a battery with high voltage cathodes.

Cycling Performance Example

To demonstrate the effect that pre-wetting the ion-conducting membrane with an organic liquid solution prior to surrounding the ion-conducting membrane with an ion-conducting polymer has on the cycling performance of a hybrid solid-state electrolyte, five Li—Li symmetric cells were cycled at different currents (25, 50, and 75 µA) at room temperature. The five Li—Li symmetric cells consisted of a Li—Li symmetric Control cell (from Comparative Example 1) that was not pre-wet with any organic liquid solution, and four Li—Li symmetric cells (from Example 1, Example 2, Example 3, and Comparative Example 2) pre-wet with a different respective organic liquid solution.

Figure 9C:
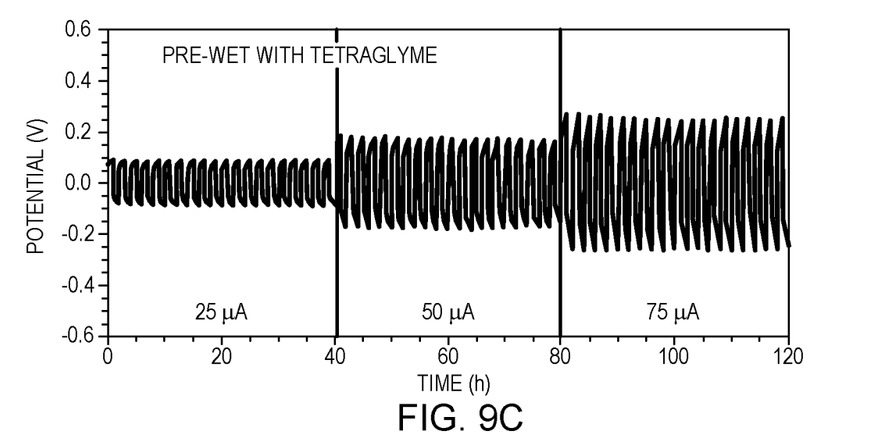
FIG. 9C is a plot of the cycling performance of an Li—Li symmetrical cell pre-wet with tetraglyme.

As depicted by FIG. 9C, the Li—Li symmetric cell of Example 1 pre-wet with tetraglyme shows stable cycling with an overpotential of 0.09V, 0.2V, and 0.27V when cycled at currents of 25 µA, 50 µA, and 75 µA, respectively.

Figure 9D:
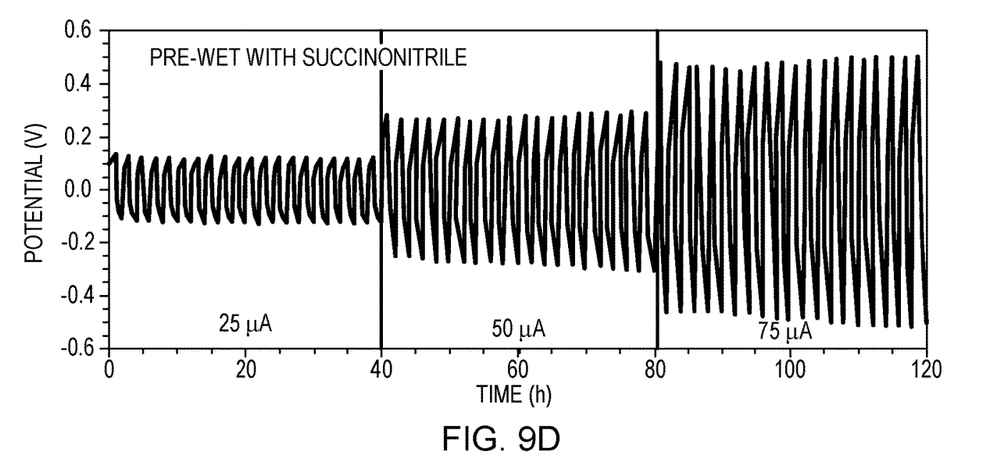
FIG. 9D is a plot of the cycling performance of an Li—Li symmetrical cell pre-wet with succinonitrile.

As depicted by FIG. 9D, the Li—Li symmetric cell of Example 2 pre-wet with succinonitrile shows stable cycling with an overpotential of 0.13V, 0.27V, and 0.47V when cycled at currents of 25 µA, 50 µA, and 75 µA, respectively.

Figure 9E:
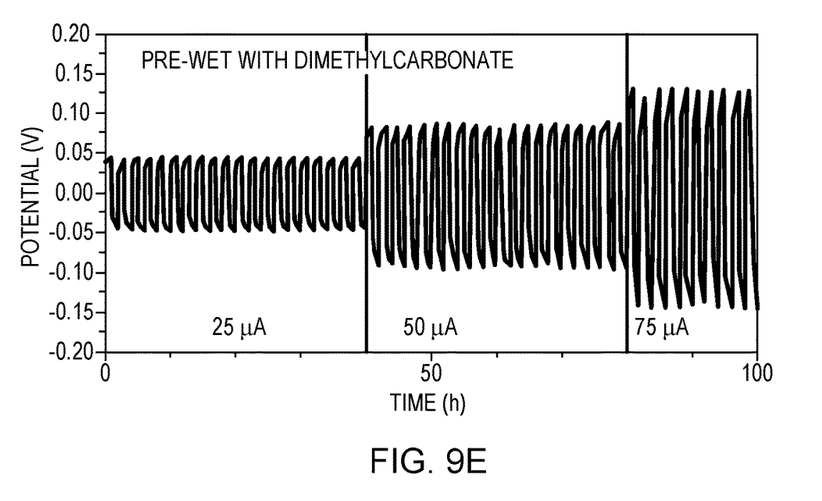
FIG. 9E is a plot of the cycling performance of an Li—Li symmetrical cell pre-wet with dimethyl carbonate.

As depicted by FIG. 9E, the Li—Li symmetric cell of Example 3 pre-wet with dimethyl carbonate shows stable cycling with an overpotential of 0.05V, 0.09V, and 0.17V when cycled at currents of 25 µA, 50 µA, and 75 µA, respectively.

As depicted by FIGS. 9C, 9D, and 9E, the cycling data for those Li—Li symmetric cells of Example 1, Example 2, and Example 3 pre-wet with tetraglyme, succinonitrile, and dimethyl carbonate, respectively, had lower overpotential at all currents (25, 50, and 75 µA) with stable cycling performance. On the other hand, as depicted by FIG. 9A, the Li—Li symmetric Control cell of Comparative Example 1 that was not pre-wet with an organic liquid solution showed increased overpotential and unstable cycling at 25 and 50 µA currents, with the overpotential reaching 5V higher at a current of 75 µA. The increased overpotential and unstable cycling is the direct result of an interfacial layer that is less lithium-ion conducting in between the ion-conducting membrane and the ion-conducting polymer.

As depicted by FIG. 9B, the Li—Li symmetric cell of Comparative Example 2 pre-wet with dimethoxyethane showed increased interfacial resistance, which in turn was responsible for irregular cycling and higher overpotential during cycling. It should be noted that the process of fabricating the hybrid-solid state electrolyte of the Li—Li symmetric cell of Comparative Example 2 involved a thermal curing step that may have partially removed some or all of the dimethoxyethane applied to the ion-conducting membrane due to its lower boiling point (85° C.). Furthermore, when a polymer film was used instead of a polymer precursor, the electrochemical cycling did not provide consistent results between cells. Thus, the ion-conducting membrane should be pre-wet with organic liquid solutions with a boiling point higher than (85° C.) and a vapor pressure lower than 20 mmHg 20° C.

Long Term Cycling Performance Example

Figure 10A:
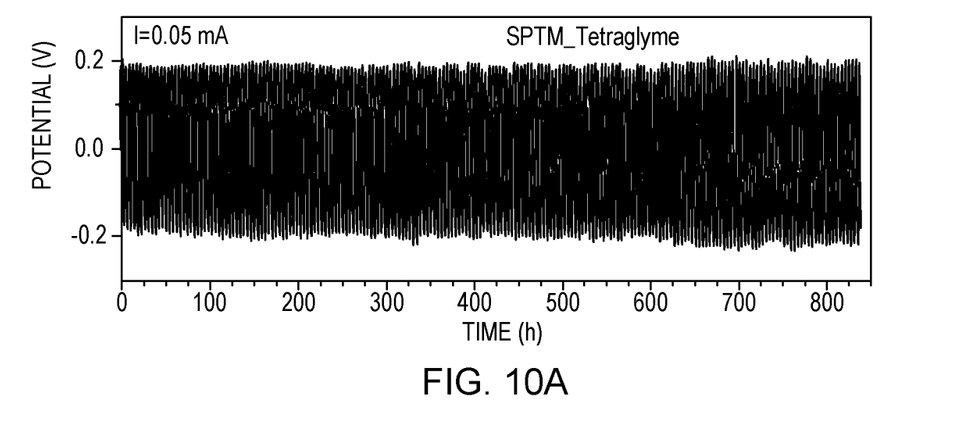
FIG. 10A is a plot of the cycling performance of an Li—Li symmetric cell pre-wet with tetraglyme cycled over a period of more than 800 hours.
Figure 10B:
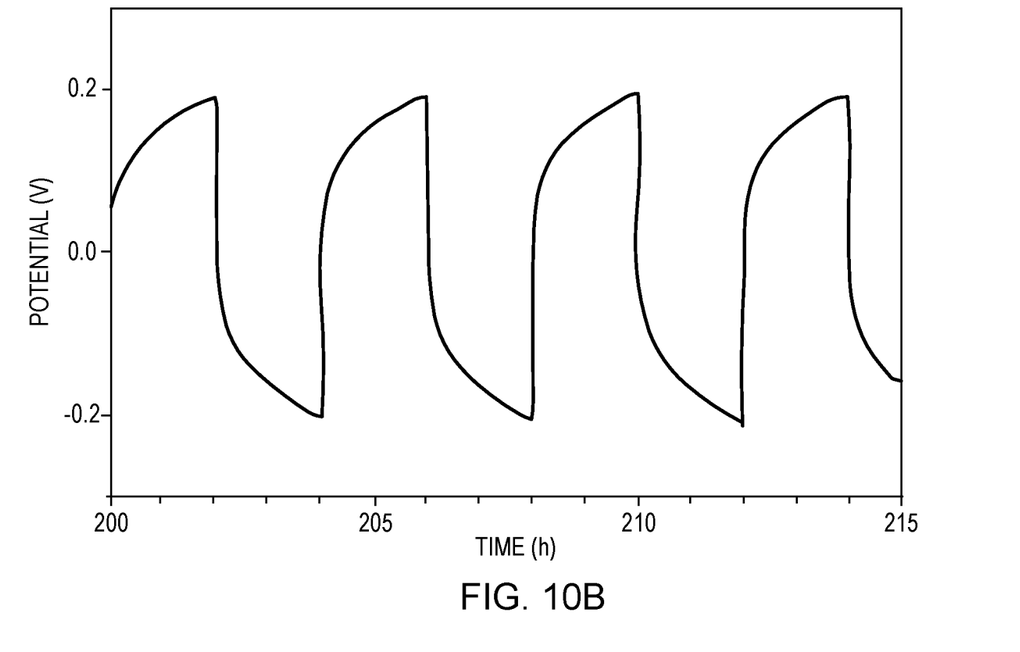
FIG. 10B is an exploded view of the plot depicted in FIG. 10A.

To demonstrate the effect that pre-wetting the ion-conducting membrane with an organic liquid solution prior to surrounding the ion-conducting membrane with an ion-conducting polymer has on the cycling performance of a hybrid solid-state electrolyte, the Li—Li symmetric cell of Example 1 pre-wet with tetraglyme was cycled at a current of 50 µA over a longer period of time. As depicted by FIG. 10A, the Li—Li symmetric cell of Example 1 pre-wet with tetraglyme showed stable cycling over a period of more than 800 hours. FIG. 10B is an exploded view of plot depicted in FIG. 10A. As depicted in FIG. 10B, the Li—Li symmetric cell of Example 1 pre-wet with tetraglyme displayed an overpotential of 0.2V over a period of more than 800 hours.

What is claimed is:

1. A hybrid-solid state electrolyte, comprising:
   an inorganic ion-conducting membrane, wherein the inorganic ion-conducting membrane includes an outer surface;
   a first layer of an organic liquid solution applied to the outer surface of the inorganic ion-conducting membrane; and
   a second layer of an ion-conducting polymer surrounding the first layer of the organic liquid solution applied to the outer surface of the inorganic ion-conducting membrane.

2. The hybrid solid-state electrolyte of claim 1, wherein the inorganic ion-conducting membrane is formed from a single layer of ion-conducting ceramic particles linked by an insulating polymer matrix, wherein the ion-conducting particles are less than 50 µm in size.

3. The hybrid solid-state electrolyte of claim 1, wherein the organic liquid solution includes at least one compound selected from the group consisting of an ethereal compound, a nitrile-based compound, and a carbonate-based compound, or combinations thereof.

4. The hybrid solid-state electrolyte of claim 1, wherein the organic liquid solution further includes a salt that releases metal ions.

5. The hybrid solid-state electrolyte of claim 1, wherein the organic liquid solution has a boiling point higher than 85° C. and a vapor pressure lower than 20 mmHg at 20° C.

6. The hybrid solid-state electrolyte of claim 1, wherein the ion-conducting polymer is selected from a linear polymer, a crosslinked polymer, a star polymer, a block copolymer, and combinations thereof.

7. The hybrid solid-state electrolyte of claim 1, wherein the second layer of the ion-conducting polymer further comprises an inorganic filler selected from the group consisting of carbon nanotubes, polyhedral oligomeric silsesquioxane (POSS) compounds, and metal oxides, or combinations thereof.

8. The hybrid solid-state electrolyte of claim 1, wherein the second layer of the ion-conducting polymer further includes an additive to enhance conductivity selected from the group consisting of ethereal-based compounds, nitrile-based compounds, carbonate-based compounds, and ionic liquids, or combinations thereof.

9. An energy storage device, comprising:
   an inorganic ion-conducting membrane, wherein the inorganic ion-conducting membrane includes an outer surface;
   a first layer of an organic liquid solution applied to the outer surface of the inorganic ion-conducting membrane;
   a second layer of an ion-conducting polymer surrounding the first layer of the organic liquid solution applied to the outer surface of the inorganic ion-conducting membrane; and
   a plurality of electrodes.

10. The energy storage device of claim 9, wherein the inorganic ion-conducting membrane is formed from a single layer of ion-conducting ceramic particles linked by an insulating polymer matrix, wherein the ion-conducting particles are less than 50 µm in size.

11. The energy storage device of claim 9, wherein the organic liquid solution includes at least one compound selected from the group consisting of an ethereal compound, a nitrile-based compound, and a carbonate-based compound, or combinations thereof.

12. The energy storage device of claim 9, wherein the organic liquid solution further includes a salt that releases metal ions.

13. The energy storage device of claim 9, wherein the organic liquid solution has a boiling point higher than 85° C. and a vapor pressure lower than 20 mmHg at 20° C.

14. The energy storage device of claim 9, wherein the ion-conducting polymer is selected from the group consisting of a linear polymer, a crosslinked polymer, a star polymer, a block copolymer, and combinations thereof.

15. The energy storage device of claim 9, wherein the second layer of the ion-conducting polymer further comprises an inorganic filler selected from the group consisting of carbon nanotubes, polyhedral oligomeric silsesquioxane (POSS) compounds, and metal oxides, or combinations thereof.

16. The energy storage device of claim 9, wherein the second layer of the ion-conducting polymer further comprises an additive to enhance conductivity selected from the group consisting of ethereal-based compounds, nitrile-based compounds, carbonate-based compounds, and ionic liquids, or combinations thereof.

17. A method for making an energy storage device, comprising:
applying a first layer of an organic liquid solution to an inorganic ion-conducting membrane;
applying a second layer of an ion-conducting pre-polymer mixture over the organic liquid solution; and
assembling the ion-conducting membrane including the first layer of the organic liquid solution and the second layer of the ion-conducting pre-polymer mixture and a plurality of electrodes to form the energy storage device.

18. The method of claim 17, further comprising curing the energy storage device to polymerize the ion-conducting pre-polymer mixture, wherein the curing is performed by at least one curing means selected from the group consisting of ultraviolet (UV) light, visible light, heat, microwaves, and ultrasound.

19. The method of claim 17, wherein the organic liquid solution has a boiling point higher than 85° C. and a vapor pressure lower than 20 mmHg at 20° C.

20. The method of claim 17, wherein:
the organic liquid solution includes at least one compound selected from the group consisting of an ethereal compound, a nitrile-based compound, and a carbonate-based compound, or combinations thereof;
the organic liquid solution further includes a lithium salt;
the ion-conducting pre-polymer mixture comprises polymerizable compounds selected from the group consisting of monomers and oligomers, or combinations thereof, a lithium salt, and polymerization initiator;
the ion-conducting pre-polymer mixture further includes an inorganic filler selected from the group consisting of carbon nanotubes, polyhedral oligomeric silsesquioxane (POSS) compounds, and metal oxides, or combinations thereof; and
the ion-conducting pre-polymer mixture further includes an additive to enhance conductivity selected from the group consisting of ethereal-based compounds, nitrile-based compounds, carbonate-based compounds, and ionic liquids, or combinations thereof.

* * * * *